Figure 1:
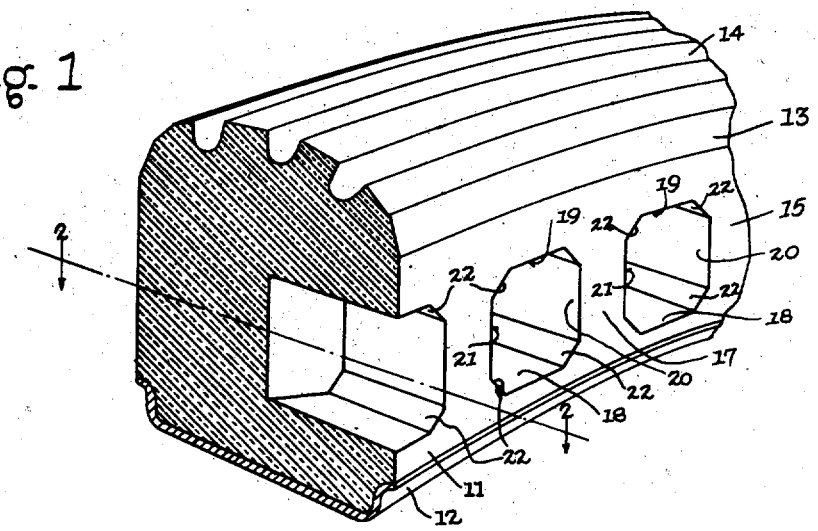

July 15, 1924.

Re. 15,872

W. A. BRUBAKER

CUSHION TIRE

Original Filed Dec. 29, 1921

William A. Brubaker
Inventor
by Smith and Freeman
Attorneys

Reissued July 15, 1924. Re. 15,872

UNITED STATES PATENT OFFICE.

WILLIAM A. BRUBAKER, OF AKRON, OHIO.

CUSHION TIRE.

Original No. 1,414,252, dated April 25, 1922, Serial No. 525,553, filed December 29, 1921. Application for reissue filed February 1, 1924. Serial No. 690,097.

*To all whom it may concern:*

Be it known that I, WILLIAM A. BRUBAKER, a citizen of the United States, residing at Akron, in the county of Summit and State of Ohio, have invented a certain new and useful Improvement in Cushion Tires, of which the following is a full, clear, and exact description, reference being had to the accompanying drawings.

Figure 2:
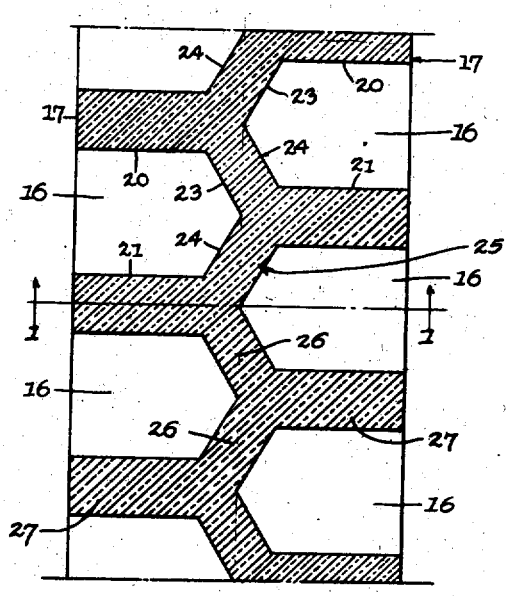

My invention relates to cushion tires and the principal object of my invention is to provide a cushion tire easy to manufacture, so formed as to minimize the likelihood of wave formation in the cushion portions, so formed as to constantly carry the load partly on air and partly on rubber, so formed as to yield readily under blows or impacts and to thus simulate as closely as possible the resiliency of a pneumatic tire, and so constructed that the resistance to yielding is substantially the same at every point about the periphery of the tire. In the drawings accompanying this specification and forming a part thereof I have shown, for purposes of illustration, one form which my invention may assume. In these drawings:

Figure 1 is a perspective view of this illustrative embodiment of my invention showing also a section on the line 1—1 of Figure 2, while Figure 2 is a section on the line 2—2 of Figure 1.

The tire herein shown comprises a base region 11 secured to a rim 12 of any suitable construction, a tread region 13 carrying a ribbed tread 14, and an intermediate region 15 disposed between the base region 11 and the tread region 13 effective to firmly connect the base region 11 and the tread region 13 and formed to accomplish the objects of my invention.

In the present embodiment of my invention I attain these results by forming in the intermediate region 15 a plurality of recesses 16 arranged in two sets each extending inwardly from one of the two lateral faces 17 of the intermediate region 15 and in this particular embodiment of my invention the recesses 16 of each set are arranged in staggered relation to the recesses 16 of the other set and each recess 16 of either set is of a generally square cross-section formed by the faces 18 and 19 generally perpendicular to the radial line passing through the center thereof and the faces 20 and 21 generally parallel to the axial plane through the center of the recess 16. In this embodiment, however, this square cross-section is modified by the presence of the four inclined surfaces 22 extending between the main surfaces 18, 20, 19, and 21, while each of the recesses 16 is terminated by a pair of plane surfaces 23 and 24 each lying in a radial plane disposed at an angle to the median plane of the tire equal to that angle at which the other is disposed to such median plane whereby the faces 23 and 24 of any one recess 16 are parallel respectively to the faces 23 and 24 of every other recess 16. The recesses 16 are each symmetrical, and the wall or web separating the recesses is also symmetrical.

The formation of these recesses 16 causes the intermediate region 15 to consist of a web 25 itself consisting of a peripherally extending sinuous rib 26 flanked on each side by a series of laterally extending fins 27, while the dimensions and positioning of these recesses 16 results in forming the rib 26 and fins 27 of a width less than the height thereof and less than the circumferential extent of each recess 16.

Because of the sinuousity of the rib 26 and the spaced relation of the fins 27 wave formation in the intermediate region 15 is prevented; because of the continuity of the web 25 the weight of the vehicle is carried always partly directly on rubber; because of the positioning and size of the fins 27 the weight of the vehicle is carried always partly on air, on rubber having no direct support and carried in tension from the adjacent directly supported rubber; because of the dimensions and arrangement of the various portions of the web 25, every part of the web 25 may yield readily and will readily absorb any shock imposed upon the tire; and because of the general proportioning and arrangement of parts the resistance of the tire to compression is substantially uniform at every point about the circumference of the tire.

It will be understood by those skilled in the art that these results may be attained by constructions other than the one herein specifically disclosed and that the attainment of these results is affected by such factors as the width of the fins relative to the width of the apertures, the width of the fins relative to the width of the rib, the height of the web relative to the width of the web, the relative height of the web at various points, the extent of sinuosity of the rib, and the length of the fins.

From the above description it will be obvious to those skilled in the art that the particular embodiment of my invention herein shown accomplishes the objects of my invention. It will also be obvious to those skilled in the art that various other physical constructions would also accomplish these objects and that the particular embodiment herein shown and described may be variously changed and modified without sacrificing the advantages of my invention or departing from the spirit thereof. It will therefore be understood that the disclosure herein is illustrative only and that my invention is not limited thereto except as it may be specifically so limited by the appended claims.

I claim:

1. A cushion tire comprising an annular elastic body provided on each lateral side with a circumferentially extending series of recesses which project into the tire body to a point approximately central thereof, each recess being provided at its inner end with two walls which meet at an angle along a line running with a radius of the tire and each of said walls being disposed in parallel relation to a similar wall of one of the recesses on the other side of the tire.

2. A cushion tire comprising an annular elastic body provided on each lateral side with recesses which project therein to a point approximately central thereof in parallel spaced relation to the axis of the tire, the recesses on one side of the tire being alternately arranged in respect to the recesses on the other side thereof and each recess provided at its inner end with walls which intersect at an angle along a line running with a radius of the tire, said recesses being arranged to provide a solid portion which extends in a series of sharp turns circumferentially of the tire.

3. A tire comprising an annular elastic body having a plurality of holes in each of its sides, each of said holes having parallel side walls which terminate in spaced relation to the center of the tire body and each being provided with two end walls, which are disposed at an angle to said side walls and at an angle to each other so as to intersect along a line running with a radius of the tire.

4. A tire comprising an annular elastic body having a plurality of holes in each of its sides, each of said holes being of uniform cross section and extending into the tire body in parallel relation to the axis thereof, each hole provided at the inner end thereof with walls which are disposed at an angle to the axis of the tire and intersect along a line running with a radius of the tire.

5. A tire comprising an annular elastic body having a plurality of holes in each of its sides, each of said holes being of uniform cross-sectional contour and extending into the tire body in parallel relation to the axis thereof, each hole provided at the inner end thereof, with walls which are disposed at an angle to the axis of the tire and intersect along a line running with a radius of the tire, each of said end walls being disposed in spaced parallel relation to an end wall of a similar opening on the other side of the tire.

6. In a cushion tire, an annular elastic body including a solid base portion and a solid tread portion and a compressible center portion concentrically arranged therebetween, said central portion disposed in a series of sharp angles forming a plurality of alternately disposed oblique truss members and provided with laterally directed truss members which extend alternately from each angle in said central portion to opposite sides of the tire.

7. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib and of a width not greater than the height thereof or than the width of the spaces on the other side of said rib, said rib being not wider than the width of said fins.

8. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib and of a width not greater than the width of the spaces on the other side of said rib, said rib being not wider than the width of said fins.

9. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib and of a width not greater than the height thereof or than the width of the spaces on the other side of said rib and with said spaces extending from the exterior of said tire substantially to the center line of said tire and with said rib thus relatively narrow.

10. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib extending only from those portions of said rib disposed intermediate the portions of said rib from which extend the fins on the other side of said rib and with the spaces between said fins extending from the exterior of said tire substantially to the center line of said tire and with said rib thus relatively narrow.

11. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed in staggered relation to the fins on the other side of said rib and with said rib and fins so formed that the resistance to compression of said intermediate region is substantially constant at all points peripherally of said tire and with the spaces between said fins extending from the exterior of said tire substantially to the center line of said tire and with said rib thus relatively narrow.

12. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib and of a width not greater than the width of the spaces on the other side of said rib and with said spaces extending from the exterior of said tire substantially to the center line of said tire and with said rib thus relatively narrow.

13. A cushion tire comprising an annular base region, an annular tread region, and an annular intermediate region disposed between said base region and said tread region and comprising a central peripherally extending sinuous rib and a plurality of fins extending laterally from each side of said rib in peripherally spaced relation with the fins on each side of said rib disposed opposite the spaces on the other side of said rib and of a width not greater than the height thereof or than the width of the spaces on the other side of said rib, said rib being not wider than the width of said fins.

14. A cushion tire comprising an annular base region, an annular tread region, and an annular intermediate region disposed between said base region and said tread region and comprising a central peripherally extending sinuous rib and a plurality of fins extending laterally from each side of said rib in peripherally spaced relation with the fins on each side of said rib disposed opposite the spaces on the other side of said rib and of a width not greater than the width of the spaces on the other side of said rib, said rib being not wider than the width of said fins.

15. A cushion tire comprising an annular base region, an annular tread region, and an annular intermediate region disposed between said base region and said tread region and comprising a central peripherally extending sinuous rib and a plurality of fins extending laterally from each side of said rib in peripherally spaced relation with the fins on each side of said rib disposed opposite the spaces on the other side of said rib and of a width not greater than the height thereof or than the width of the spaces on the other side of said rib.

16. A cushion tire comprising an annular base region, an annular tread region, and an annular intermediate region disposed between said base region and said tread region and comprising a central peripherally extending sinuous rib and a plurality of fins extending laterally from each side of said rib in peripherally spaced relation with the fins on each side of said rib extending only from those portions of said rib disposed intermediate the portions of said rib from which extend the fins on the other side of said rib.

17. A cushion tire comprising an annular base region, an annular tread region, and an annular intermediate region, disposed between said base region and said tread region and comprising a central peripherally extending sinuous rib and a plurality of fins extending laterally from each side of said rib in peripherally spaced relation with the fins on each side of said rib disposed in staggered relation to the fins on the other side of said rib and with said rib and fins so formed that the resistance to compression of said intermediate region is substantially constant at all points peripherally of said tire.

18. A cushion tire comprising an annular base region, an annular tread region, and an annular intermediate region disposed between said base region and said tread region and comprising a central peripherally extending sinuous rib and a plurality of fins extending laterally from each side of said rib in peripherally spaced relation with the fins on each side of said rib disposed opposite the spaces on the other side of said rib and of a width not greater than the width of the spaces on the other side of said rib.

19. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib and of a width not greater than the height thereof or than the width of the spaces on the other side of said rib, said rib being not wider than the width of said fins and said spaces extending from the exterior of said tire substantially to the center line of said tire and said rib being thus relatively narrow.

20. A cushion tire comprising an annular base region, an annular tread region, and an annular intermediate region disposed between said base region and said tread region and comprising a central peripherally extending rib and a plurality of fins extending laterally from each side of said rib in peripherally spaced relation with the fins on each side of said rib disposed opposite the spaces on the other side of said rib and of a width not greater than the width of the spaces on the other side of said rib, said rib being not wider than the width of said fins and said spaces extending from the exterior of said tire substantially to the center line of said tire and said rib being thus relatively narrow.

WILLIAM A. BRUBAKER.